May 5, 1970 T. W. ENOCHS 3,509,951
METHOD OF PREVENTING DRILLING FLUID LOSS DURING WELL DRILLING
Original Filed Feb. 14, 1966
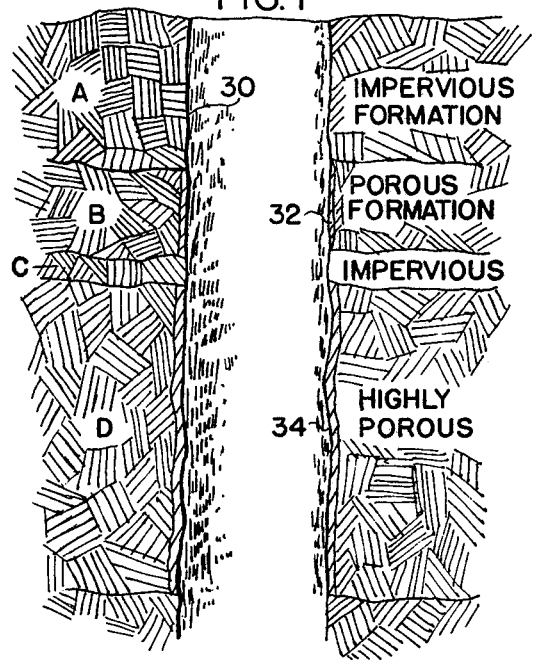
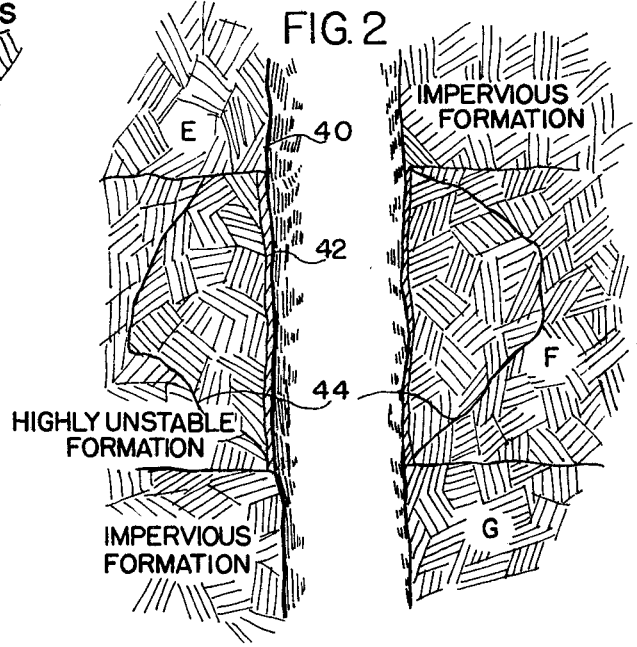
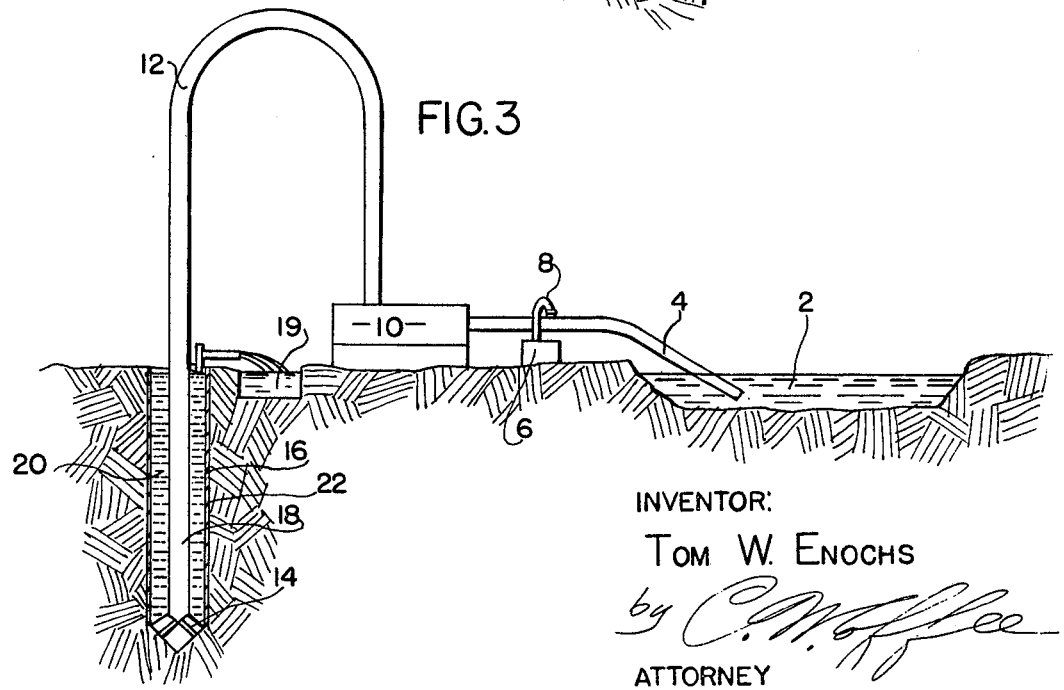
INVENTOR:
Tom W. Enochs
by C. M. ?ee
ATTORNEY

United States Patent Office 3,509,951
Patented May 5, 1970

3,509,951
METHOD OF PREVENTING DRILLING FLUID LOSS DURING WELL DRILLING
Tom W. Enochs, Midland, Tex., assignor to Specialty Research & Sales, Inc., Midland, Tex., a corporation of Texas
Continuation of application Ser. No. 527,227, Feb. 14, 1966. This application Aug. 11, 1967, Ser. No. 659,984
Int. Cl. E21b 21/04
U.S. Cl. 175—70                                    11 Claims

ABSTRACT OF THE DISCLOSURE

A wax emulsion is used to control loss of the drilling fluid while drilling wells. The wax emulsion is so formulated that the wax remains in emulsion with the drilling fluid during the time it is pumped through the drill stem and the nozzles of the drill bit, but that it is sheared or broken out of the emulsion as soon as the drilling fluid enters into a porous underground strata.

CROSS-REFERENCE TO RELATED APPLICATIONS

This application is a continuation of my patent application No. 527,227, filed Feb. 14, 1966, now abandoned.

BACKGROUND OF THE INVENTION

Field of the invention

This invention relates to well drilling and more particularly to the prevention of loss of drilling fluids to the stabilization downhole formations Description of the prior art Loss of drilling fluid in rotary drilling of wells is a long recognized problem. Fluid loss results in many problems, e.g., differential sticking of the drill pipe. Differential sticking occurs when the drill pipe rests against the side of the borehole and the fluid behind the drill pipe seeps into the formation reducing the pressure on that side. The normal downhole well pressure is exerted on the other side. Lummus et al. U.S. Pat. No. 3,223,622, discusses the problem of differential sticking and suggests the use of surfactants to overcome it.

In commercial practice today, the almost exclusive way of controlling the problem of fluid loss is by the use of drilling mud as a drilling fluid, i.e., considerable material, mostly clays, is mixed with water to form a slurry-like material used for drilling fluid. Then if downhole formations are porous so that they tend to absorb moisture, the particles of mud are generally of sufficient diameter that they will not seep into the formation along with the water. Therefore, they form "a filter cake" upon the borehole surface. Many products have been added to prevent loss of circulation, typical examples being: cotton-seed hulls, shredded rubber, ground pine, dried bagasse fiber, cellophane flakes, ground mica flakes, and ground paper. Also, Dobson, et al., U.S. Pat. No. 2,380,156, suggest using an asphalt emulsion with the mud to form a more compact and impervious cake. Of course, this is a simplified description of the complex art.

The formation of the filter cake upon the borehole wall has been recognized as undesirable. See for example, Australian Pat. No. 253,258 on the second page where this undesirability is discussed. Therein a solution is suggested by having a material which enters into the formation and reacts, evidently, chemically, with a dissolving of a solvent so that a material remains in the formation to prevent the additional loss of fluid in the formation.

Watson, U.S. Pat. No. 3,108,441, issued Oct. 29, 1963, suggests a means for decreasing water loss in surface canals and ponds such as used for irrigation. He suggests emulsifying wax and mixing this with the water. Over a 24 or 48 hour period, the emulsion will seep into the ground where at a depth of about two (2") inches beneath the surface the wax will de-emulsify and form a membrane with the soil, which will decrease the percolation of the fluid into the soil. Watson, in his introductory statement, indicates that the invention has practical applications in drilling oil wells, however, he does not make any specific description of the use of the invention in that regard.

SUMMARY OF THE INVENTION

I have developed a method for preventing loss of drilling fluids in the drilling of wells. I emulsify wax in water and use the water-wax emulsion as the drilling fluid. The emulsion is made so that the emulsion is not broken by the violent agitation resulting in the pumping of the liquid or the jetting of the fluid from the nozzles in the drill bit. However, the emulsion is broken as soon as the fluid begins entering the formation so that the wax membrane is deposited within the formation. The reason why the emulsion will break or shear within the formation, and not because of the agitation in the pumps or the nozzles, is not fully understood. It may be that the agitation in the nozzles or the pumps activates some of the ingredients so that they are ready to react to break or shear the emulsion when the emulsion enters into the hairline fractures and crevices and interstices of the formation. It may be the frictional abrasive contact of the emulsion upon the minute openings through the formation that causes the emulsion to break or shear. Regardless of how it works, it is important to prevent the emulsion from shearing or breaking outside of the formation and, also, to insure that it breaks or shears immediately upon entry of the formation. If the emulsion breaks before entering the formation, wax balls and globules form either in the drill stem, which will stop up the nozzles in the drill bit and cause difficulty, or otherwise the wax will form balls in the annulus between the well-bore wall and the drill stem and cause trouble in this area.

Also, it is important for it to immediately shear to prevent the loss of fluid. If there is a substantial loss of fluid into the formation before shearing, a great deal of the beneficial application is lost. E.g., in modern-day techniques, often penetration rates of a hundred feet per hour are achieved. Therefore, if five hours were required before the emulsion broke and the fluid loss was stopped, it would mean that five hundred feet of penetration would be lost before the fluid loss on a previous level was stopped, to say nothing of the considerable loss of fluid, etc.

The advantages of stopping the fluid loss are recognized in the art. E.g., as discussed above, differential sticking of the drill pipe is a consequence of fluid loss. Furthermore, many formations which are self-supporting will be softened by the addition of water, or other drilling fluids, so that they will cave in, resulting in stuck tools and perhaps even loss of the well.

In addition to stopping the loss of fluid in the formation, my invention also stabilizes the formation. The wax particles form a membrane or structural substance having greater strength than the unadultered strata in its original condition.

An object of this invention is to prevent drilling fluid loss in drilling wells and to stabilize downhole formations.

Other objects are to achieve the above with a method that is rapid and inexpensive and does not require skilled people to formulate, adjust, operate, and maintain.

Further objects are to achieve the above using equipment and materials readily available on the market that are sturdy, stable, compact, durable, simple, safe, versatile, and reliable, yet inexpensive and easy to manufacture, install, operate and maintain.

The specific nature of the invention, as well as other objects, uses, and advantages thereof, will clearly appear from the following description and from the accompanying drawing, the different views of which are not necessarily to the same scale.

DESCRIPTION OF THE DRAWING

FIG. 1 is a sectional view illustrating a water impervious membrane in porous formations during the drilling process.

FIG. 2 is a sectional view showing the effects of the membrane, as opposed to the relatively higher hole size when drilling through highly unstable formations without the addition of a sealant.

FIG. 3 is a block diagram of the drilling process showing how the sealant may be added to the drilling fluid.

DESCRIPTION OF SPECIFIC EMBODIMENT

As is illustrated in FIG. 3, the fluid drilling reservoir at 2 provides a source of drilling fluid. The sealant (more fully described hereafter) is contained in container 6 and is added to the suction 4 of the mud pump 10 by feed line 8. The blended mixture of the sealant is directed from the mud pump 10 and through pipe 12 to the drill pipe 18. The mixture is jetted through nozzles in the drill 14. If a porous formation is present, the emulsion will enter or be dispersed in the formation, shear and form a membrane. The bulk of the drilling fluid will return to the surface through the annulus 20 between the drill pipe 18 and the borehole 16 and flow into settling pit 19. If an impervious formation is present, the entire drilling fluid emulsion mitxure will return to the surface and flow into pit 19.

The various ingredients of the sealant emulsion are as follows:

Seelo-W, a wax emulsion product of Chevron Chemical Co. made in accordance with the process described in U.S. Pat. No. 3,108,441, issued Oct. 29, 1963, to Watson and assigned to California Research Corporation;

100% active nonylphenoxypoly (ethyleneoxy) ethanol, a nonionic surfactant;

100% active coconut oil fatty acid amine condensate modified, an anionic surfactant;

Fluid-trol, a product of Pan-American Petroleum Corporation, a surface-active agent made according to the description of U.S. Pat. 3,223,622, issued Dec. 14, 1965, to Lummus et al., and basically is a product of four parts of a half ammonium half isopropylamine salt of the sulfosuccinic acid ester of the oleic acid amide of isopropanol amine and about one part of the isopropylamine salt of dodecyl benzene sulfonic acid;

Tap water;
Methyl alcohol; and,
Sinclair Chemical Co.'s P-555, an oleic acid diamine.

A typical example of the ratios of use would be:

220 gallons of Seelo-W
4 gallons nonylphenoxypoly (ethyleneoxy) ethanol
1 gallon fatty acid amine condensate
2 gallons Fluid-trol
21 gallons tap water
27 gallons of Methanol
25 cc. Sinclair Chemical Co.'s P-555.

Sinclair Chemical Co.'s product, P-555, is added to prevent decomposition of the blend. If the product is to be used immediately upon mixing, this decomposition preventative may be omitted. However, if it is thought it would be necessary to store the mixture, it is needed to be added or the mixture will sour.

If there is any danger that the mixture will be exposed to sufficiently low temperatures that it might freeze, additional methanol may be added. The alcohol must be added very slowly with slight agitation. Otherwise, when the alcohol is added, it will cause the mixture to shear with the formation of the wax. Once the emulsion is broken, the product must be discarded.

Generally, one to fifteen gallons of the nonionic surfactant may be used and one to ten gallons of Fluid-trol surfactant may be used. The amount of methyl alcohol is not particularly critical.

The main criteria in the selection of the materials and of the mixing of them is that the emulsion does not break and wax does not form when it is being violently agitated in the mud pump 10 or jetted from the drilling nozzles 14. Yet, it is necessary that the emulsion breaks and the wax form as soon as any of the mixture enters the formations.

I have found that it is desirable to add ten gallons of the mixture specified above for 300 square feet of borehole wall. I.e., a well having an eleven (11") inch diameter hole in 100 feet of depth has approximately 300 square feet of wall surface area. Therefore, the rate of injection of the mixture from container 6 into the suction line 4 should be set at an hourly rate to provide this amount, regardless of the amount of drilling fluid which is used. Thus the driller knowing what his penetration rate is would supply the mixture at the desired rate. The rate specified will result in approximately one pound of wax per square yard of wetted surface of the borehole.

If more of the emulsion is used than the recommended rate, there is danger that it may shear and result in formation of wax in the annulus 20. If less than the recommended rate is used, there is a danger that the membrane will not be formed with the result of the loss of fluid. The limits are not less than one gallon nor more than 50 gallons per 300 square feet of well bore face. Stated otherwise, between 0.1–5 pounds wax per square yard of borehole surface.

FIG. 1 shows the result of the use of this invention. When borehole 30 is made in an impervious formation, such as impervious formation A, there will be no flow or filtration of drilling fluid, with its emulsion, into the formation and, therefore, there will be no shearing or breaking of the emulsion there and the formation will be in its original condition. Inasmuch as the formation is impervious, it is stable as existed before the drilling of the well. In a formation B, which is a porous formation, there will be a flow of the drilling fluid, with the emulsion, into the formation and immediately upon the flow of the drilling fluid into the formation, there will be breaking or shearing of the emulsion, resulting in the formation of a membrane 32 there. Subsequent impervious formation C will again result in no deposit or no formation, leaving a clean borehole the same as existed with borehole wall 30 in formation A. However, a highly porous formation, such as formation or strata D, will result in the flow of drilling fluids which will result in the formation of membrane 34.

FIG. 2 illustrates the possible result. Strata F is a highly unstable formation located between impervious formations E and G. Without stabilization, or when the drilling fluid wets the formation and destroys its stability by weakening the normal binding forces which have held this structure together before the introduction of the drilling fluid, it would tend to slough off and cave in, forming a cavity as would be seen by the outline 44 when borehole 40 is made. However, with the inclusion of emulsions, forming the membrane 42 which first prevents loss of fluid into the formation F and second additionally strengthens the wall of the borehole, it will prevent this from happening and will result in a borehole of uniform diameter. The diameter of the borehole at membrane 42 being the same as the diameter at 40 through the impervious formation E.

Although the sealant of this invention is adapted to be used with mud, it has great utility in water drilling, i.e., drilling without addition of clays or the material to the water except for this sealant.

An alternative method of introduction is that the sealant may be introduced, undiluted, directly into the drill pipe when a particularly porous strata is encountered.

Thus it may be seen that using the method of my invention it is possible to drill wells faster and more economically.

It will be apparent that the embodiment shown is only exemplary and that various modifications can be made in operation, construction, materials, and arrangement within the scope of the invention as defined in the appended claims.

I claim as my invention:

1. In well drilling, the method for preventing drilling fluid loss in porous formations comprising:
   (a) preparing a sealant including a wax emulsion with additives to control the shearing of the emulsion,
   (b) adding the sealant to the drilling fluid in amounts of from 1–50 gallons per 300 square feet of the well bore face created by drilling,
   (c) forcing the mixture of drilling fluid and sealant down the drill into the well in contacting action with the face of said porous formation,
   (d) dispersing the sealant into the porous formations, thereby building up a wax membrane and preventing drilling fluid loss in said porous formations;
   (e) said additives comprising
      (i) nonylphenoxypoly (ethyleneoxy) ethanol,
      (ii) fatty acid amine condensate, and
      (iii) a product having four parts of a half ammonium half isopropylamine salt of the sulfosuccinic acid ester of the oleic acid amide of isopropanol amine and about one part of the isopropylamine salt of dodecyl benzene sulfonic acid.

2. The invention as defined in claim 1 with the additional limitation of
   (f) said additives also including
      (iv) an oleic acid diamine substance as a preservative.

3. The invention as defined in claim 2 with the additional limitation of
   (g) said additives also including
      (v) methanol which was added slowly with slight agitation for the purpose of reducing the freezing point.

4. In well drilling, the method for preventing drilling fluid loss in porous formations comprising:
   (a) preparing a sealant including a wax emulsion with additives to control the shearing of the emulsion,
   (b) said additives comprising
      (i) at least one nonionic surfactant, and
      (ii) at least one anionic surfactant,
   (c) adding the sealant to the drilling fluid in amounts of from 1–50 gallons sealant per 300 square feet of the well bore face created by drilling,
   (d) pumping said mixture of sealant and drilling fluid down the drill pipe,
   (e) said additives preventing the emulsion from shearing during pumping,
   (f) jetting said mixture from the drill,
   (g) said additives preventing the emulsion from shearing during jetting, and
   (h) dispersing the sealant into the porous formation,
   (j) said additives permitting the emulsion to shear during dispersing thus
   (k) building an impervious wax membrane within the porous formation,
   (m) said additives also including
      (iii) a product having four parts of a half ammonium half isopropylamine salt of the sulfosuccinic acid ester of the oleic acid amide of isopropanol amine and about one part of the isopropylamine salt of dodecyl benzene sulfonic acid.

5. In well drilling, the method of preventing drilling fluid loss in porous formations comprising:
   (a) preparing a sealant including a wax emulsion with additives to control the shearing of the emulsion,
   (b) said additives comprising
      (i) at least one nonionic surfactant, and
      (ii) at least one anionic surfactant,
   (c) adding the sealant to the drilling fluid in amounts of from 1–50 gallons sealant per 300 square feet of the well bore face created by drilling,
   (d) pumping said mixture of sealant and drilling fluid down the drill pipe,
   (e) said additives preventing the emulsion from shearing during pumping,
   (f) jetting said mixture from the drill,
   (g) said additives preventing the emulsion from shearing during jetting, and
   (h) dispersing the sealant into the porous formation,
   (j) said additives permitting the emulsion to shear during dispersing thus
   (k) building an impervious wax membrane within the porous formation,
   (m) said nonionic surfactant being nonylphenoxypoly (ethyleneoxy) ethanol.

6. In well drilling, the method for preventing drilling fluid loss in porous formations comprising:
   (a) preparing a sealant including a wax emulsion with additives to control the shearing of the emulsion,
   (b) said additives comprising
      (i) at least one nonionic surfactant, and
      (ii) at least one anionic surfactant,
   (c) adding the sealant to the drilling fluid in amounts of from 1–50 gallons sealant per 300 square feet of the well bore face created by drilling,
   (d) pumping said mixture of sealant and drilling fluid down the drill pipe,
   (e) said additives preventing the emulsion from shearing during pumping,
   (f) jetting said mixture from the drill,
   (g) said additives preventing the emulsion from shearing during jetting, and
   (h) dispersing the sealant into the porous formation,
   (j) said additives permitting the emulsion to shear during dispersing thus
   (k) building an impervious wax membrane within the porous formation,
   (m) said anionic surfactant being a fatty acid amine condensate.

7. In well drilling, the method for preventing drilling fluid loss in porous formations comprising:
   (a) preparing a sealant including a wax emulsion with additives to control the shearing of the emulsion,
   (b) said additives comprising
      (i) at least one nonionic surfactant, and
      (ii) at least one anionic surfactant,
   (c) adding the sealant to the drilling fluid in amounts of from 1–50 gallons sealant per 300 square feet of the well bore face created by drilling,
   (d) pumping said mixture of sealant and drilling fluid down the drill pipe,
   (e) said additives preventing the emulsion from shearing during pumping,
   (f) jetting said mixture from the drill,
   (g) said additives preventing the emulsion from shearing during jetting, and
   (h) dispersing the sealant into the porous formation,
   (j) said additives permitting the emulsion to shear during dispersing thus
   (k) building an impervious wax membrane within the porous formation,
   (m) said additives also including an oleic acid diamine substance as a preservative.

8. In drilling wells in porous formations by use of
   (a) a drill attached to the bottom of
   (b) a drill pipe, and (c) a mud pump for forcing drilling fluid down through the drill pipe and drill, and back up the annulus between the drill pipe and borehole;
(d) the method of preventing loss of drilling fluid into the porous formation comprising the steps of:
(e) supplying a wax emulsion to the mud pump with the drilling fluid
(f) at a rate of 0.1–5 pounds wax per square yard borehole surface,
(g) pumping the mixture of drilling fluid and wax emulsion through the mud pump and drill pipe without shearing the emulsion,
(h) jetting said mixture from said nozzles without shearing the emulsion, and
(j) dispersing said mixture into the porous formation,
(k) shearing the emulsion in the formation thus
(m) forming a membrane of wax in the porous formation which prevents the loss of drilling fluid, said wax emulsion having an additive of
(n) a product having four parts of a half ammonium half isopropylamine salt of the sulfosuccinic acid ester of the oleic acid amide of isopropanol amine and about one part of the isopropylamine salt of dodecyl benzene sulfonic acid.

9. In drilling wells in porous formations by use of
(a) a drill attached to the bottom of
(b) a drill pipe, and
(c) a mud pump for forcing drilling fluid down through the drill pipe and drill, and back up the annulus between the drill pipe and borehole;
(d) the method of preventing loss of drilling fluid into the porous formation comprising the steps of:
(e) supplying a wax emulsion to the mud pump with the drilling fluid
(f) at a rate of 0.1–5 pounds wax per square yard borehole surface,
(g) pumping the mixture of drilling fluid and wax emulsion through the mud pump and drill pipe without shearing the emulsion,
(h) jetting said mixture from said nozzles without shearing the emulsion, and
(j) dispersing said mixture into the porous formation,
(k) shearing the emulsion in the formation thus
(m) forming a membrane of wax in the porous formation which prevents the loss of drilling fluid, said wax emulsion having an additive of
(n) nonylphenoxypoly (ethyleneoxy) ethanol.

10. In drilling wells in porous formations by use of
(a) a drill attached to the bottom of
(b) a drill pipe, and
(c) a mud pump for forcing drilling fluid down through the drill pipe and drill, and back up the annulus between the drill pipe and borehole;
(d) the method of preventing loss of drilling fluid into porous formation comprising the steps of:
(e) supplying a wax emulsion to the mud pump with the drilling fluid
(f) at a rate of 0.1–5 pounds wax per square yard borehole surface,
(g) pumping the mixture of drilling fluid and wax emulsion through the mud pump and drill pipe without shearing the emulsion,
(h) jetting said mixture from said nozzles without shearing the emulsion, and
(j) dispersing said mixture into the porous formation,
(k) shearing the emulsion in the formation thus
(m) forming a membrane of wax in the porous formation which prevents the loss of drilling fluid, said wax emulsion having an additive of
(n) fatty acid amine condensate.

11. In drilling wells in porous formations by use of
(a) a drill attached to the bottom of
(b) a drill pipe, and
(c) a mud pump for forcing drilling fluid down through the drill pipe and drill, and back up the annulus between the drill pipe and borehole;
(d) the method of preventing loss of drilling fluid into the porous formation comprising the steps of:
(e) supplying a wax emulsion to the mud pump with the drilling fluid
(f) at a rate of 0.1–5 pounds wax per square yard borehole surface,
(g) pumping the mixture of drilling fluid and wax emulsion through the mud pump and drill pipe without shearing the emulsion,
(h) jetting said mixture from said nozzles without shearing the emulsion, and
(j) dispersing said mixture into the porous formation,
(k) shearing the emulsion in the formation thus
(m) forming a membrane of wax in the porous formation which prevents the loss of drilling fluid, said wax emulsion having an additive of
(n) an oleic acid diamine substance as a preservative.

References Cited
UNITED STATES PATENTS

| | | | |
|---|---|---|---|
| 1,307,027 | 6/1919 | Swan | 166—25 |
| 2,380,156 | 7/1945 | Dobson et al. | 175—72 |
| 2,543,868 | 3/1951 | Prokop | 166—32 |
| 2,666,620 | 1/1954 | Welge et al. | 166—32 |
| 3,108,441 | 10/1963 | Watson | 61—36 |
| 3,124,934 | 3/1964 | Glenn | 61—36 |
| 3,126,957 | 3/1964 | McKinnell | 166—11 |
| 3,150,726 | 9/1964 | Bodine | 175—72 |
| 3,213,356 | 10/1965 | Brown et al. | 61—36 X |
| 3,223,622 | 12/1965 | Lummus | 252—8.5 |
| 3,373,106 | 3/1968 | Lister et al. | 175—69 X |

STEPHEN J. NOVOSAD, Primary Examiner

U.S. Cl. X.R.
175—72; 252—8.5